US010713233B2

(12) United States Patent
Sakai et al.

(10) Patent No.: US 10,713,233 B2
(45) Date of Patent: Jul. 14, 2020

(54) INFORMATION MANAGEMENT SYSTEM

(71) Applicant: Kabushiki Kaisha Toshiba, Minato-ku (JP)

(72) Inventors: Hiroshi Sakai, Kawasaki (JP); Ryo Morinaga, Yokosuka (JP); Sei Musha, Kawasaki (JP); Otoharu Kuwamura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 226 days.

(21) Appl. No.: 15/698,225

(22) Filed: Sep. 7, 2017

(65) Prior Publication Data

US 2018/0081876 A1 Mar. 22, 2018

(30) Foreign Application Priority Data

Sep. 16, 2016 (JP) ................................. 2016-181224
Mar. 16, 2017 (JP) ................................. 2017-051369
Jun. 29, 2017 (JP) ................................. 2017-127708

(51) Int. Cl.
*G06Q 10/00* (2012.01)
*G06F 16/23* (2019.01)
(Continued)

(52) U.S. Cl.
CPC ............ *G06F 16/23* (2019.01); *G06F 16/119* (2019.01); *G06F 16/1774* (2019.01);
(Continued)

(58) Field of Classification Search
None
See application file for complete search history.

(56) References Cited

U.S. PATENT DOCUMENTS 5,767,848 A * 6/1998 Matsuzaki ............. G06Q 10/10
715/705
5,924,103 A * 7/1999 Ahmed ............... G06F 16/2365
(Continued)

FOREIGN PATENT DOCUMENTS

EP 1 174 813 A2 1/2002
JP 2000-231543 A 8/2000
(Continued)

OTHER PUBLICATIONS

K. Cheng, P. Y. Pan, and D. K. Harrison (The Internet as a tool with application to agile manufacturing: a web-based engineering approach and its implementation issues, Int. J. Prod. Res., 2000, vol. 38, No. 12, 2743± 2759)). (Year: 2000).*
(Continued)

*Primary Examiner* — Hafiz A Kassim
(74) *Attorney, Agent, or Firm* — Oblon, McClelland, Maier & Neustadt, L.L.P.

(57) ABSTRACT

According to an embodiment, an information management system includes a storing unit and an information transfer unit. The storing unit includes a production management database, an electronic document database, and a progress information database. The production management database stores a work schedule. The electronic document database stores a work report. The progress information database stores progress information of work. An access authority is set for each of the plurality of databases. The information transfer unit transfers, among the plurality of databases, information stored in each of the databases. The information transfer unit transfers the work schedule from the production management database to the progress information database and a work result included in the work report from the electronic document database to the progress information database. The progress information is created using the
(Continued)

transferred work schedule and the transferred work result and stored in the progress information database.

11 Claims, 15 Drawing Sheets

(51) Int. Cl.
    *G06F 16/93*     (2019.01)
    *G06F 16/11*     (2019.01)
    *G06F 16/176*     (2019.01)
    *G06Q 10/06*     (2012.01)
    *H04L 29/08*     (2006.01)
    *G06Q 10/10*     (2012.01)

(52) U.S. Cl.
    CPC ........... *G06F 16/93* (2019.01); *G06Q 10/063* (2013.01); *H04L 67/1097* (2013.01); *G06Q 10/10* (2013.01)

(56) References Cited

U.S. PATENT DOCUMENTS

| | | | | |
|---|---|---|---|---|
| 6,212,499 B1* | 4/2001 | Shigeeda | ............ | G10L 15/285 704/231 |
| 8,271,314 B2* | 9/2012 | Lungu | ............ | G06Q 10/06 705/7.23 |
| 2002/0059110 A1* | 5/2002 | Yamamoto | ............ | G06Q 10/08 705/26.1 |
| 2002/0138340 A1* | 9/2002 | Ikezawa | ............ | G06Q 10/06311 705/7.15 |
| 2003/0120503 A1* | 6/2003 | Davidson | ............ | G06Q 10/10 705/317 |
| 2003/0150909 A1* | 8/2003 | Markham | ............ | B23Q 35/12 235/376 |
| 2003/0171963 A1* | 9/2003 | Kurihara | ............ | G05B 19/41865 703/10 |
| 2003/0233294 A1* | 12/2003 | Luo | ............ | G06Q 10/06 705/28 |
| 2005/0021331 A1* | 1/2005 | Huang | ............ | G10L 15/08 704/231 |
| 2009/0177660 A1* | 7/2009 | Itou | ............ | G06F 16/93 |
| 2010/0217422 A1* | 8/2010 | Takahashi | ............ | G06Q 10/06 700/107 |
| 2011/0238617 A1* | 9/2011 | Ozawa | ............ | G06F 16/93 707/608 |
| 2013/0085901 A1* | 4/2013 | Henderson | ............ | G06Q 10/04 705/28 |
| 2014/0156686 A1* | 6/2014 | Woodings | ............ | G06Q 10/06 707/756 |
| 2015/0180833 A1* | 6/2015 | Snow | ............ | G06F 21/6245 713/155 |
| 2016/0275636 A1* | 9/2016 | Olenick | ............ | G06Q 50/2053 |

FOREIGN PATENT DOCUMENTS

| | | | | |
|---|---|---|---|---|
| JP | 2001-52083 | | 2/2001 | |
| JP | 2002-7657 A | | 1/2002 | |
| JP | 2002-32114 A | | 1/2002 | |
| JP | 2003-256624 A | | 9/2003 | |
| JP | 2003256624 A | * | 9/2003 | |
| JP | 2005-190309 A | | 7/2005 | |
| JP | 2010-176525 A | | 8/2010 | |
| JP | 2011-154099 A | | 8/2011 | |
| JP | 2015-75792 A | | 4/2015 | |
| JP | 2015075792 A | * | 4/2015 | |
| WO | WO 2015/079575 A1 | | 6/2015 | |
| WO | WO-2015079575 A1 | * | 6/2015 | ............ G10L 15/22 |
| WO | 2016/064337 A1 | | 4/2016 | |

OTHER PUBLICATIONS

K Maekawa, H Koiso, S Furui, H Isahara (Spontaneous Speech Corpus of Japanese, LREC, 2000). (Year: 2000).*

Kikuchi M et al., "Use of i-mode cellular phones for facility management system", proceedings of the 2001 ASME/IEEE Joint Railroad Conference. Toronto, Ontario, Canada, Apr. 17-19, 2001; NY: IEES, US, pp. 135-139.

* cited by examiner

WORK MANAGEMENT INFORMATION

| RESPONSIBLE PERSON | BASE NAME | NAME |
|---|---|---|
|  |  |  |

| | ↓ INPUT | REMARKS |
|---|---|---|
| DELIVERY DESTINATION OFFICE NAME | × × × OFFICE | |
| INSTALLATION PLACE NAME | ○ BUILDING 1F | |
| MODEL | C-100 | |
| TYPE OF WORK | CARRY-IN | |
| ZIP CODE | 000-0000 | |
| WORK START DATE | 2016/9/1 | |
| DELIVERY DATE | | |
| WORK COMPLETION DATE | | |

| | ↓ INPUT | REMARKS |
|---|---|---|
| MACHINE MANUFACTURING NUMBER | ABC97531 | |
| MACHINE SERVICE NUMBER | 3 | |
| PRINTER MANUFACTURING NUMBER | | |

| | ↓ INPUT | REMARKS |
|---|---|---|
| READING APPARATUS TYPE NAME | | |
| NUMBER OF READING APPARATUSES | | |
| MANAGEMENT APPARATUS TYPE NAME | | |
| NUMBER OF MANAGEMENT APPARATUSES | | |
| MANAGEMENT APPARATUS TERMINAL | | |

FIG. 3

INSTALLATION PROGRESS TABLE

DATE

INSTALLATION DESTINATION

MODEL

RESPONSIBLE PERSON

| PROCESS | PROGRESS MAN-HOUR | IMPLEMENTATION CONTENT | START TIME | END TIME | COMPLETED | REMARKS |
|---|---|---|---|---|---|---|
| CARRY-IN | 6.0H | CURING | 12:30 | 13:05 | ✓ | |
| | | CARRY-IN | 13:10 | 18:10 | ✓ | |
| MAIN BODY INSTALLATION | 5.0H | DOCKING | | | | |
| | | WIRING | | | | |
| READING APPARATUS INSTALLATION | 3.0H | WIRING | | | | |
| | | LAN CONNECTION | | | | |
| MANAGEMENT APPARATUS INSTALLATION | 3.0H | ASSEMBLY | | | | |
| | | LAN CONNECTION | | | | |
| MANAGEMENT APPARATUS TERMINAL INSTALLATI | 3.0H | ASSEMBLY | | | | |
| | | LAN CONNECTION | | | | |
| MAIN BODY/POWER ON | 1.5H | SHORT-CIRCUIT CHECK | | | | |
| | | POWER ON | | | | |
| INSTALLATION WORK | 3.0H | VARIOUS KINDS OF SETTING | | | | |
| | | INSTALL | | | | |

FIG. 4

REPORT

WORK TYPE _____      DEPARTMENT _____

MODEL NAME _____     NAME _____

| No | CLASSIFI-CATION | OCCURRENCE DATE | REPORT CONTENT | MEASURES | WORK MAN-HOUR | INSUFFICIENT COMPONENT | REMARKS |
|----|-----------------|-----------------|----------------|----------|---------------|------------------------|---------|
|    |                 |                 |                |          |               |                        |         |
|    |                 |                 |                |          |               |                        |         |
|    |                 |                 |                |          |               |                        |         |
|    |                 |                 |                |          |               |                        |         |
|    |                 |                 |                |          |               |                        |         |
|    |                 |                 |                |          |               |                        |         |

FIG. 5

MEASUREMENT CHECK SHEET

WORK PLACE NAME _____   DEPARTMENT _____

MODEL NAME _____   NAME _____

| | | STANDARD | RECOMMENDATION | MEASUREMENT | DETERMINATION | REMARKS |
|---|---|---|---|---|---|---|
| 200V BREAKER | RATED CURRENT | | 100A | 98A | APPROVED | |
| | SCREW SIZE | | M8 | ✓ | | |
| AC100V BREAKER FOR PANEL INPUT | RATED CURRENT | | 20A | 21A | DENIED | |
| | SCREW SIZE | | M6 | ✓ | | |
| 200V BREAKER FOR PC INPUT | RATED CURRENT | | 15A | | | |
| | SCREW SIZE | | M6 | | | |
| 200V BREAKER FOR READING APPARATUS INPUT | RATED CURRENT | | 15A | | | |
| | SCREW SIZE | | M6 | | | |

FIG. 6

WORK DAILY REPORT

WORK PLACE NAME _____   NUMBER _____
SYSTEM TYPE NAME _____   OPERATOR NAME _____
DATE _____   COMPANY NAME _____   NUMBER OF WORKING PEOPL _____

| No | WORK NAME | START TIME | END TIME | REQUIRED TIME PERIOD | NUMBER OF WORKING PEOPL | WORK MAN-HOUR |
|---|---|---|---|---|---|---|
| 1 | MONITORING CONTROL APPARATUS ① | | | | | |
| 2 | MONITORING CONTROL APPARATUS ② | | | | | |
| 3 | MONITORING CAMERA | | | | | |
| 4 | RADIO APPARATUS ① (ASSEMBLY) | | | | | |
| 5 | RADIO APPARATUS ① (INSPECTION) | | | | | |
| 6 | RADIO APPARATUS ② (ASSEMBLY) | | | | | |
| 7 | RADIO APPARATUS ② (INSPECTION) | | | | | |
| 8 | APPARATUS FOR VEHICLE DETECTION ① (ADJUSTMENT) | | | | | |
| 9 | APPARATUS FOR VEHICLE DETECTION ① (OTHER THAN ADJUSTMENT) | | | | | |
| 10 | APPARATUS FOR VEHICLE DETECTION ② (ADJUSTMENT) | | | | | |
| 11 | APPARATUS FOR VEHICLE DETECTION ② (OTHER THAN ADJUSTMENT) | | | | | |
| 12 | OPERATION PANEL | | | | | |
| 13 | DISPLAY | | | | | |
| 14 | READING APPARATUS | | | | | |
| 15 | CLEANING | | | | | |
| 16 | | | | | | |
| 17 | | | | | | |
| 18 | | | | | | |

| | WORK No | CONTENT |
|---|---|---|
| SPECIAL REPORT 1 | | |
| SPECIAL REPORT 2 | | |

| | | START TIME | END TIME | REQUIRED TIME PERIOD | NUMBER OF WORKING PEOPL | WORK MAN-HOUR |
|---|---|---|---|---|---|---|
| OTHERS | EXAMPLE) HEATER INSPECTION (CONSTRUCTION · CUSTOMER · FAILURE HANDLING) | 8:00 | 10:00 | 120 MINUTES | 3 | 360 MINUTES |
| | (CONSTRUCTION · CUSTOMER · FAILURE HANDLING) | | | | | |
| | (CONSTRUCTION · CUSTOMER · FAILURE HANDLING) | | | | | |

FIG. 7

△△△ MESSRS. CO., LTD.

| APPARATUS FOR VEHICLE DETECTION (TYPE 1) | | ADJUSTMENT CONFIRMATION DOCUMENT |
|---|---|---|
| MANUFACTURING NUMBER | (LIGHT RECEIVER) | 0123 |
| | (LIGHT PROJECTOR) | 0300 |
| | (FOOTBOARD 1) | 19733 |
| | (FOOTBOARD 2) | 19734 |
| | (FOOTBOARD 3) | 19735 |
| | (FOOTBOARD 4) | 19736 |

ADJUSTMENT IMPLEMENTATION DATE    2016/8/29

NAME OF PERSON IN CHARGE

FIG. 8

CONSTRUCTION PROGRESS (CUMULATIVE TOTAL BY MONTH)                                                                     UNIT: DAY

|  | TOTAL | | | APPARATUS A INSTALLATION | | | APPARATUS B REMODELING | | | OTHERS | | |
|---|---|---|---|---|---|---|---|---|---|---|---|---|
|  | SCHEDULE | RESULT | DIFFERENCE (REMAINDER) | SCHEDULE | RESULT | DIFFERENCE | SCHEDULE | RESULT | DIFFERENCE | SCHEDULE | RESULT | DIFFERENCE |
| DEC | 56 | 54 | -2 | 11 | 10 | -1 | 32 | 32 | 0 | 13 | 12 | -1 |
| JAN | 84 | 54 | -30 | 52 | 30 | -22 | 32 | 24 | -8 | 0 | 0 | 0 |
| FEB | 118 | 0 | -118 | 67 | 0 | -67 | 39 | 0 | -39 | 12 | 0 | -12 |
| MAR | 42 | 0 | -42 | 24 | 0 | -24 | 18 | 0 | -18 | 0 | 0 | 0 |
| TOTAL | 300 | 108 | -192 | 154 | 40 | -114 | 121 | 56 | -65 | 25 | 12 | -13 |

CONSTRUCTION PROGRESS (TODAY)   1/25                                    UNIT: DAY

|  | THIS MONTH | | | CUMULATIVE TOTAL | | | |
|---|---|---|---|---|---|---|---|
|  | SCHEDULE | RESULT | DIFFERENCE | SCHEDULE (a) | RESULT (b) | DIFFERENCE | (b)/(a) |
| DEC | 7 | 7 | 0 | 56 | 54 | -2 | 96% |
| JAN | 7 | 7 | 0 | 57 | 54 | -3 | 95% |
| FEB |  |  |  | 0 | 0 | 0 | 0% |
| MAR |  |  |  | 0 | 0 | 0 | 0% |
| TOTAL |  |  |  | 113 | 108 | -5 | 96% |

FIG. 10

WORK MANAGEMENT INFORMATION

| RESPONSIBLE PERSON | BASE NAME | NAME |
|---|---|---|
|  |  |  |

| | INPUT | REMARKS |
|---|---|---|
| DELIVERY DESTINATION OFFICE NAME | ×××OFFICE | |
| INSTALLATION PLACE NAME | ○BUILDING 1F | |
| MODEL | C-100 | |
| TYPE OF WORK | CARRY-IN | |
| ZIP CODE | 000-0000 | |
| WORK START DATE | 2016/9/1 | |
| DELIVERY DATE | | |
| WORK COMPLETION DATE | | |

| | INPUT | REMARKS |
|---|---|---|
| MACHINE MANUFACTURING NUMBER | ABC97521 | |
| MACHINE SERVICE NUMBER | 3 | |
| PRINTER MANUFACTURING NUMBER | | |

| | INPUT | REMARKS |
|---|---|---|
| READING APPARATUS TYPE NAME | | |
| NUMBER OF READING APPARATUSES | | |
| MANAGEMENT APPARATUS TYPE NAME | | |
| NUMBER OF MANAGEMENT APPARATUSES | | |
| MANAGEMENT APPARATUS TERMINAL | | |

FIG. 13

INFORMATION MANAGEMENT SYSTEM

CROSS-REFERENCE TO RELATED APPLICATIONS

This application is based upon and claims the benefit of priority from Japanese Patent Application No. 2016-181224, filed on Sep. 16, 2016; Japanese Patent Application No. 2017-051369, filed on Mar. 16, 2017; and Japanese Patent Application No. 2017-127708, filed on Jun. 29, 2017; the entire contents of which are incorporated herein by reference.

FIELD

Embodiments described herein relate generally to an information management system.

BACKGROUND

When work such as installation or adjustment of an apparatus is performed in a customer's place, an operator creates a report of the work. Information included in the report is shared with other departments according to necessity.

In order to more efficiently perform the sharing of the information, it is desirable to electronically create a work report and store the work report in a database on a unitarily managed server.

BRIEF DESCRIPTION OF THE DRAWINGS

FIG. 3 is a diagram showing an input screen for a work report stored in the electronic document database of the information management system according to the first embodiment;

FIGS. 4 to 6 are diagrams showing other input screens for work reports stored in the electronic document database of the information management system according to the first embodiment;

FIG. 7 is a diagram showing an input screen for a work report stored in the electronic document database of the information management system according to the first embodiment;

FIG. 8 is a diagram showing another input screen for a work report stored in the electronic document database of the information management system according to the first embodiment;

FIGS. 10 and 11 are diagrams showing other examples of progress information created by the progress-information creating unit of the information management system according to the first embodiment;

FIG. 13 is an example of an electronic document for installation work created using the input support system according to the second embodiment;

DETAILED DESCRIPTION

Figure 1:
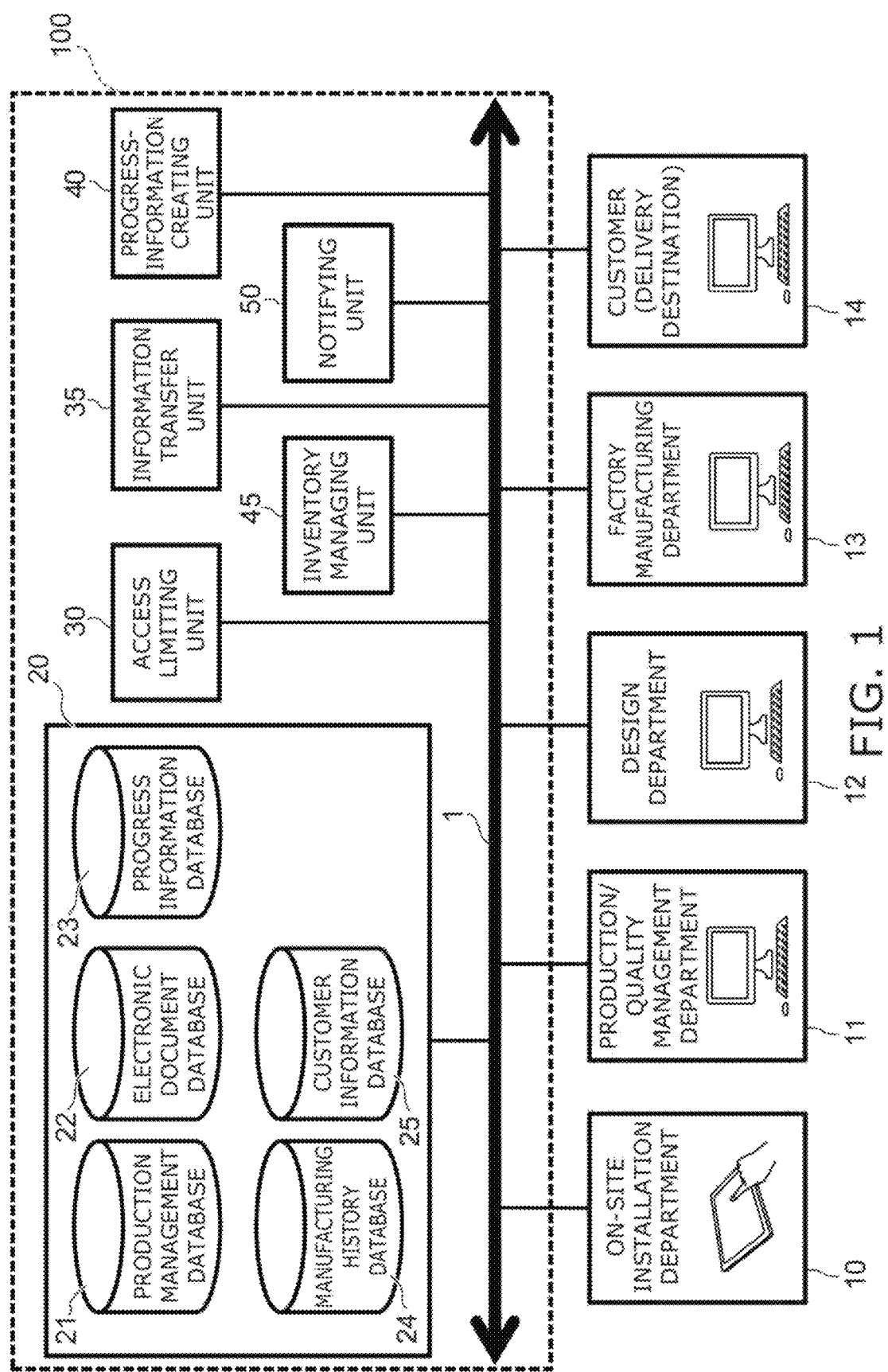
FIG. 1 is a block diagram showing a configuration of an information management system according to a first embodiment.

According to an embodiment, an information management system includes a storing unit and an information transfer unit. The storing unit includes a production management database, an electronic document database, and a progress information database. The production management database stores a work schedule. The electronic document database stores a work report. The progress information database stores progress information of work. An access authority for viewing or update is set for each of the plurality of databases. The information transfer unit transfers, among the plurality of databases, information stored in each of the databases. The information transfer unit transfers the work schedule from the production management database to the progress information database. The information transfer unit transfers a work result included in the work report from the electronic document database to the progress information database. The progress information is created using the transferred work schedule and the transferred work result and stored in the progress information database.

Embodiments of the invention will now be described with reference to the drawings.

In the drawings and the specification of the application, components similar to those described thereinabove are marked with like reference numerals, and a detailed description is omitted as appropriate.

First Embodiment

An Information management system according to a first embodiment is a system for efficiently performing management and sharing of information. The information concerns works such as Installation and adjustment of an apparatus in a site at a delivery destination.

FIG. 1 is a block diagram showing the configuration of an information management system 100 according to the first embodiment.

As shown in FIG. 1, the information management system 100 according to the first embodiment includes a storing unit 20, an access limiting unit 30, an information transfer unit 35, a progress-information creating unit 40, an inventory managing unit 45, and a notifying unit 50.

The components included in the information management system 100 are connected to one another via a network 1. A plurality of terminals is connected to the information management system 100 via the network 1. In an example shown in FIG. 1, a terminal 10 of an on-site installation department, a terminal 11 of a production/quality management department, a terminal 12 of a design department, a terminal 13 of a factory manufacturing department, and a terminal 14 of a customer are connected to the information management system 100.

The network 1 may be the Internet or may be a wired or wireless LAN (Local Area Network).

The terminals 10 to 14 may be tablets, smartphones, personal computers, or the like. Portable terminals such as tablets and smartphones are suitably used by the on-site installation department that performs work outside an office.

The storing unit 20 may be a file server, a network hard disk, or the like.

The storing unit 20 includes a production management database 21, an electronic document database 22, a progress information database 23, a manufacturing history database 24, and a customer information database 25.

The production management database 21 stores, for example, information concerning a work place, a schedule of work, members used for the work and information concerning the members, an arrival schedule of the members, and an assembly schedule of a sub-apparatus (a semi-finished product) assembled using the members.

A work schedule is created for work of each site. The work may concern installation, assembly, adjustment, or the like of apparatuses. Work schedules include information such as more specific and detailed work names, dates when work is performed, man-hours of the work, and personnel allocated to the work.

The electronic document database 22 stores, for example, a work report created by an operator in a work site and information concerning the operator.

The work report includes a work result (completed work and a time period required for the work), the number of working people, problems, and members used in the work.

The progress information database 23 stores progress information of work. The progress information can be stored in various forms. The progress information includes, for example, comparison of a work schedule and a result in any period such as one day or one week. When work for the same types of apparatuses is performed in a plurality of places, the progress information includes comparison of progresses among work sites and comparison with progresses of similar kinds of work in the past.

The manufacturing history database 24 stores information such as an arrival result of members used for work, the numbers of stocks of the members, an assembly result of the members, and an assembly result of a sub-apparatus.

The customer information database 25 stores information such as a place where work is performed, detailed dimensions and a detailed area of a work site, and an apparatus already introduced into the work site.

The access limiting unit 30 sets, for departments, an access authority for viewing or updating the databases stored in the storing unit 20. The access authority is set for the departments by, for example, a management department. The access authority may be further set for the information stored in the databases according to scopes of responsibilities of persons in charge.

The information transfer unit 35 transfers, among the databases, specific information stored in the databases.

The progress-information creating unit 40 creates progress information of work and stores the progress information in the progress information database 23.

Detailed functions of the information transfer unit 35 and the progress-information creating unit 40 are described below.

The inventory managing unit 45 calculates the numbers of stocks of members from first result data and second result data. The first result data includes the arrival results of the members stored in the manufacturing history database 24. The second result data includes use results of the members included in the work report stored in the electronic document database 22. The inventory managing unit 45 updates the numbers of stocks stored in the manufacturing history database 24 based on the calculation result.

The notifying unit 50 outputs a notification when information that needs to be notified to related departments is included in the work report. Alternatively, when information that needs to be notified to related departments is obtained from comparison of the information included in the work report and the information stored in the databases, the notifying unit 50 outputs a notification together with the information.

The notifying unit 50 includes, for example, information concerning notification destinations of the departments and the persons in charge. The notifying unit 50 automatically determines a department and a person in charge at a distribution destination corresponding to a type of a notification and issues the notification. The notification is performed by a mail, popup on terminal screens of the persons in charge, or the like.

Functions of the information transfer unit 35 are described in detail with reference to FIG. 2.

Figure 2:
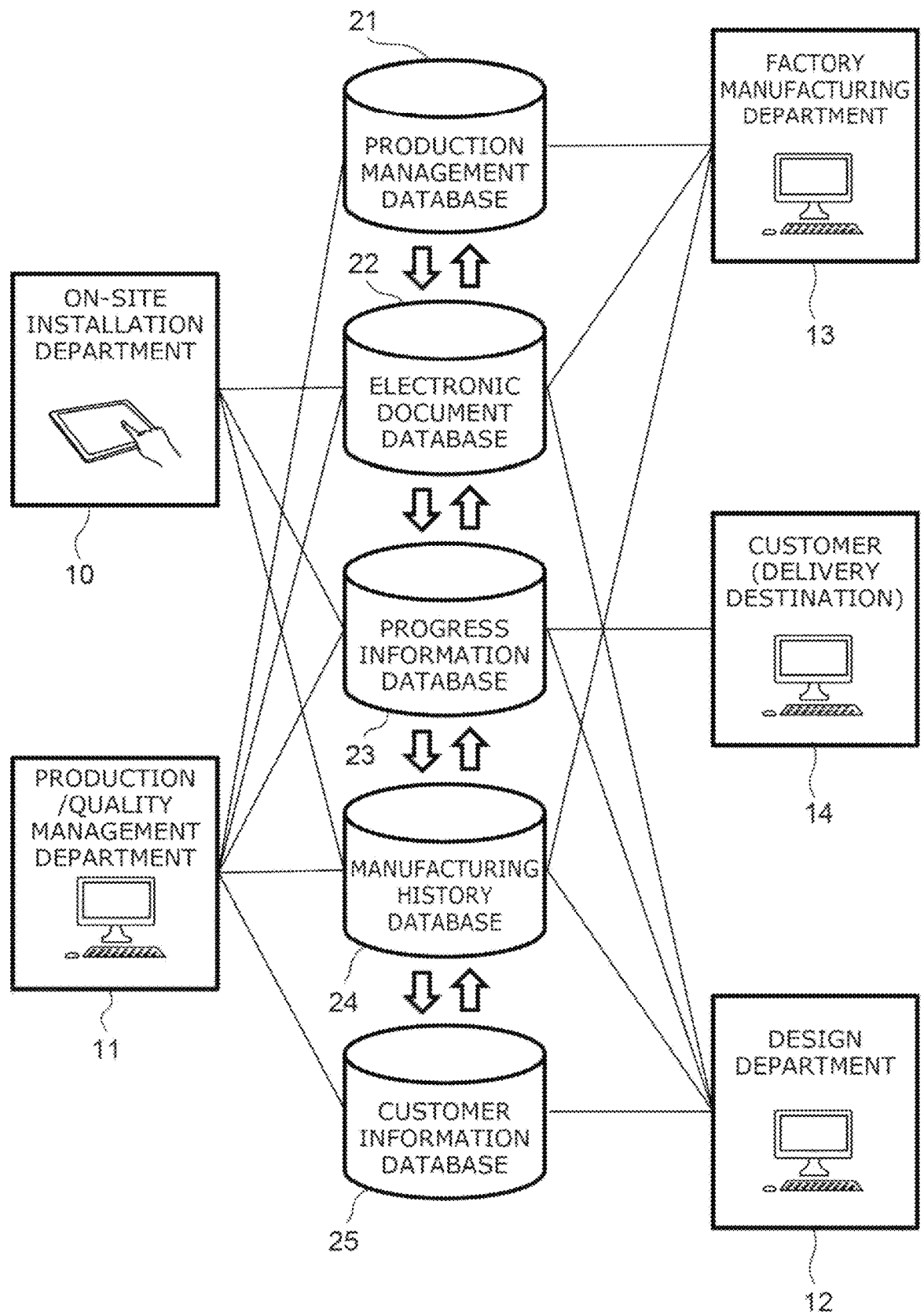
FIG. 2 is a diagram for describing the functions of the information transfer unit of the information management system according to the first embodiment.

FIG. 2 is a diagram for describing the functions of the information transfer unit 35 of the information management system 100 according to the first embodiment.

In an example shown in FIG. 2, the terminal 11 of the production/quality management department can access all of the databases. The access authority is set for the terminal 10 of the on-site installation department to enable the terminal 10 to access only the electronic document database 22, the progress information database 23, and the manufacturing history database 24.

The terminal 13 of the factory manufacturing department can access only the production management database 21, the electronic document database 22, and the manufacturing history database 24. The access authority is set for the terminal 12 of the design department to enable the terminal 12 to access only the electronic document database 22, the progress information database 23, the manufacturing history database 24, and the customer information database 25.

The access authority is set for the terminal 14 of the customer on the outside to enable the terminal 14 to access only at least a part of information of the progress information database 23.

The setting of the access authority is necessary for maintenance of security but is likely to hinder sharing of information.

Specifically, in the example shown in FIG. 2, the terminal 10 of the on-site installation department can access the electronic document database 22 but cannot access the production management database 21. Therefore, people in the on-site installation department cannot confirm a work schedule, progress of a result of a work report with respect to the work schedule, and the like of the production management database 21.

In the information management system 100 of the first embodiment, the work schedule in the production management database 21 is transferred to the progress information database 23 by the information transfer unit 35. Further, a work result included in the work report in the electronic document database 22 is extracted and transferred to the progress information database 23 by the information transfer unit 35.

In the example shown in FIG. 2, the work schedule in the production management database 21 is transferred to the progress information database 23 through the electronic document database 22 by the information transfer unit 35. The work schedule may be directly transferred from the production management database 21 to the progress information database 23 by the information transfer unit 35. Similarly, when information is transferred from a certain database to another database by the information transfer unit 35, the information may be directly transferred between the databases or may be transferred via another database.

The on-site installation department cannot access the production management database 21. However, according to the first embodiment, the on-site installation department is capable of obtaining progress information by confirming the information transferred to the progress information database 23 by the information transfer unit 35.

The progress information may be created by a user of the information management system 100. The progress information is created based on the transferred work schedule and the transferred work result. The progress information is stored in the progress information database 23. Alternatively, the progress information may be automatically created by the progress-information creating unit 40 using the transferred work schedule and the transferred work result and stored in the progress information database 23.

According to the embodiment, when the work report is uploaded to the electronic document database 22, information necessary for the respective departments is transferred among the databases by the information transfer unit 35.

Consequently, the respective departments are capable of viewing and updating the necessary information. As a result, it is possible to efficiently share the information while maintaining security.

As shown in FIGS. 1 and 2, the terminal 14 of the customer is sometimes connected to the information management system 100. In this case, it is also possible to selectively transfer, with the information transfer unit 35, to a predetermined database, only information that should be presented to customers or information that can be presented to the customers.

With such a configuration, the customers can check the information as appropriate by themselves. Thereby, for example, it is possible to save time for confirming the information with a company that is performing work. Since the company that is performing work need not to confirming the information requested from the customers and need not to prepare and present materials concerning the information, the company can also save time. Consequently, according to the first embodiment, for both of the customers and the company, it is possible to efficiently share the information concerning the work.

A work report stored in the electronic document database 22 is specifically described with reference to FIGS. 3 to 6.

In FIGS. 3 to 6, as an example, an input screen for a work report at the time when installation work of a paper sheet sorting device is performed is shown.

FIG. 3 is a diagram showing an input screen for a work report stored in the electronic document database 22 of the information management system 100 according to the first embodiment.

FIGS. 4 to 6 are diagrams showing other input screens for work reports stored in the electronic document database 22 of the information management system 100 according to the first embodiment.

On the input screen shown in FIG. 3, management information of work and a general situation of progress are input. First, the operator inputs management information such as a delivery destination office name and an installation place name. The operator inputs, for example every day, information concerning apparatuses for which installation is completed.

An office name (a name of a site), an installation place name (a place of the site), and the like are, for example, automatically input. When the work report shown in FIG. 3 is input, these kinds of information are transferred from the customer information database 25 to the electronic document database 22 by the information transfer unit 35.

In the input screen shown in FIG. 4, the operator inputs a more specific progress state of installation work. The operator inputs, with respect to specific kinds of work in processes, start times and end times of the specific kinds of work and, when the specific kinds of work are completed, checks the specific kinds of work. The input screen shown in FIG. 4 is automatically created by, for example, referring to work included in a schedule in the production management database 21.

Predicted man-hours are set in advance for the processes shown in FIG. 4. The man-hours are, for example, automatically input in association with data registered in the schedule in the production management database 21.

Concerning the work report shown in FIG. 4, time periods in which kinds of work are actually performed are calculated from the start times and the end times of the processes.

The progress-information creating unit 40 calculates, for example, a difference between the work time periods and the man-hours. Concerning all the processes for which the kinds of work are completed, the progress-information creating unit 40 extracts, from a total of the work time periods and a total of the man-hours, as progress information, a degree of excess or deficiency that occurs in the man-hours.

Alternatively, the progress-information creating unit 40 compares the completed and checked processes and implementation scheduled dates of the processes included in the kinds of work in the work schedule. The progress-information creating unit 40 creates, on the basis of a result of the comparison, progress information indicating whether a work result is ahead of or behind the schedule.

Alternatively, when the same kinds of work are performed in a plurality of places, the progress-information creating unit 40 can compare work reports of the same kinds of work and, for example, compare progress states.

In this way, the progress-information creating unit 40 can create the progress information in various forms.

When the progress is behind the schedule, for example, the notifying unit 50 issues a notification to the design department, the production/quality management department, and the like. Since the notification is issued from the notifying unit 50, the related departments can quickly grasp the delay of the work with respect to the schedule and take measures against the delay early.

On the input screen shown in FIG. 5, the operator records problems and the like that occur during the installation work. The operator inputs dates of occurrence and contents of the problems, measures against the problems, and the like and uploads the dates of occurrence and contents of the problems, the measures against the problems, and the like to the electronic document database 22. Consequently, for example, other groups that are performing the same installation work can immediately grasp the problems.

When a problem is due to a deficiency in design such as the structure, the shape, the dimension, or the like of a member, the design department can quickly confirm content of the problem and reflect the content of the problem on subsequent design jobs. Alternatively, when a problem is due to abnormality of a member such as an operation failure, the factory manufacturing department can quickly confirm content of the problem to confirm members being manufactured and improve the members.

The input screen shown in FIG. 5 may be configured to enable inputs of a type of a problem, a member in which abnormality is found, and the like. In this case, the notifying unit 50 can compare information concerning the type of the problem and the member with the information concerning the members in the production management database 21 and selectively issue a notification to departments related to the member. At this time, the notifying unit 50 may display the information concerning the target member on terminals of the related departments simultaneously with issuing the notification.

With such a configuration, the departments related to the problem can more smoothly grasp the problem and take measures.

On the input screen shown in FIG. 6, the operator inputs a result and a measurement confirmation of current measurement of an installed apparatus. Determination for the measurement result is automatically input by, for example, comparing a recommended current value and a measured value. When the work report shown in FIG. 6 is uploaded, the notifying unit 50 may notify information concerning items determined as "denied" to the related departments.

Examples of input screens for work reports concerning installation, adjustment, and the like of related apparatus in an electronic charge collection system of an expressway are described with reference to FIGS. 7 and 8.

FIG. 7 is a diagram showing an input screen for a work report stored in the electronic document database 22 of the information management system 100 according to the first embodiment.

FIG. 8 is a diagram showing another input screen for a work report stored in the electronic document database 22 of the information management system 100 according to the first embodiment.

In FIG. 7, for example, specific kinds of work involved in installation of a toll gate are listed. As in the input screen shown in FIG. 4, the operator inputs start times, end times, required time periods, and the numbers of working people for the kinds of work. Work man-hours are automatically inputs from products of the required time periods and the numbers of working people. The required time periods may be automatically calculated from the start times and the end times and input.

Under the specific kinds of work, input fields of special reports are provided. The operator inputs work in which a problem occurs, improvements that the operator notices during work, or the like together with a number of the work. Under the special reports, a field for inputting work additionally performed other than scheduled work is provided.

As described concerning the input screen shown in FIG. 5, for a case in which a problem occurs in work, the input screen shown in FIG. 7 may be configured to enable inputs of a type of the problem, a member or an apparatus in which the problem occurs, and the like.

In the work report shown in FIG. 7, when all items of the kinds of work are input, the work can be treated as having been completed. The progress-information creating unit 40 creates progress information from the information input to the work report shown in FIG. 7 and the work schedule in the production management database 21 and stores the progress information in the progress information database 23.

On the input screen shown in FIG. 8, the operator inputs an apparatus to be adjusted, a name and a manufacturing number of a member (a sub-apparatus) used for adjustment work, an adjustment implementation date, and a person in charge. The work report includes actually used apparatuses and the number of the used apparatuses.

The inventory managing unit 45 calculates latest numbers of stocks of members in a factory or the like from the arrival result of the members stored in the manufacturing history database 24 and the work report shown in FIG. 8. The inventory managing unit 45 updates the inventory information in the manufacturing history database 24 on the basis of a result of the calculation.

When the members are shipped from the factory or the like to a work site, it is also possible to confirm the numbers of shipped members and update the numbers of stocks. However, depending on work, the work is completed without using the members sent to the site. Therefore, it is desirable to input the members actually used in the site and the numbers of the members to the work report and calculate and update the numbers of stocks from the input information. Consequently, it is possible to store more accurate numbers of stocks in the manufacturing history database 24 on a real-time basis. As a result, it is possible to suppress excess and deficiency of stocks and perform more efficient inventory management.

As described above with reference to FIGS. 3 to 8, the work reports input by the operator on the site and uploaded to the electronic document database 22 include various kinds of information concerning the work. In the information management system 100 according to the first embodiment, predetermined information included in the work reports is utilized by the information transfer unit 35, the progress-information creating unit 40, the inventory managing unit 45, the notifying unit 50, and the like. Consequently, it is possible to perform timely information sharing and efficient utilization of information while maintaining security.

Figure 9:
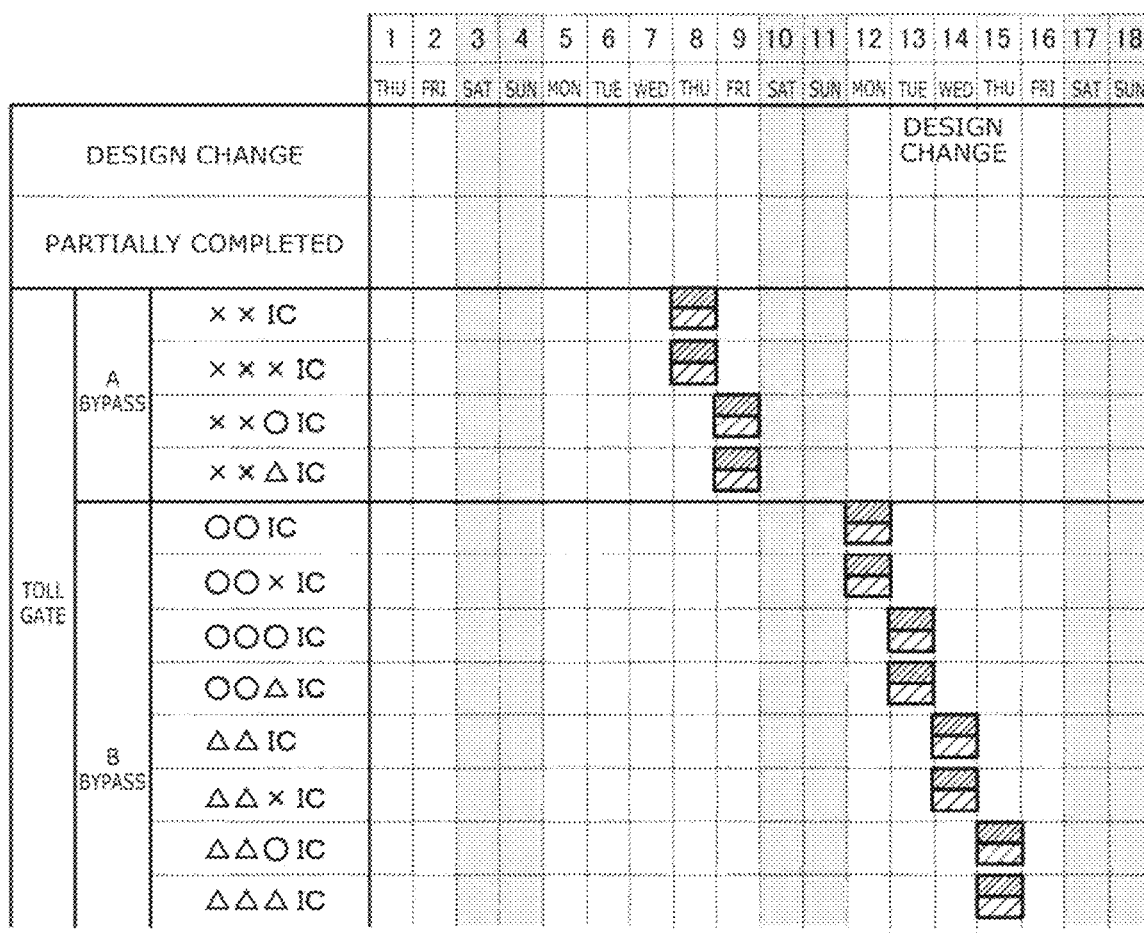
FIG. 9 is a diagram showing an example of progress information created by the progress-information creating unit 40 of the information management system according to the first embodiment.
Figure 11:
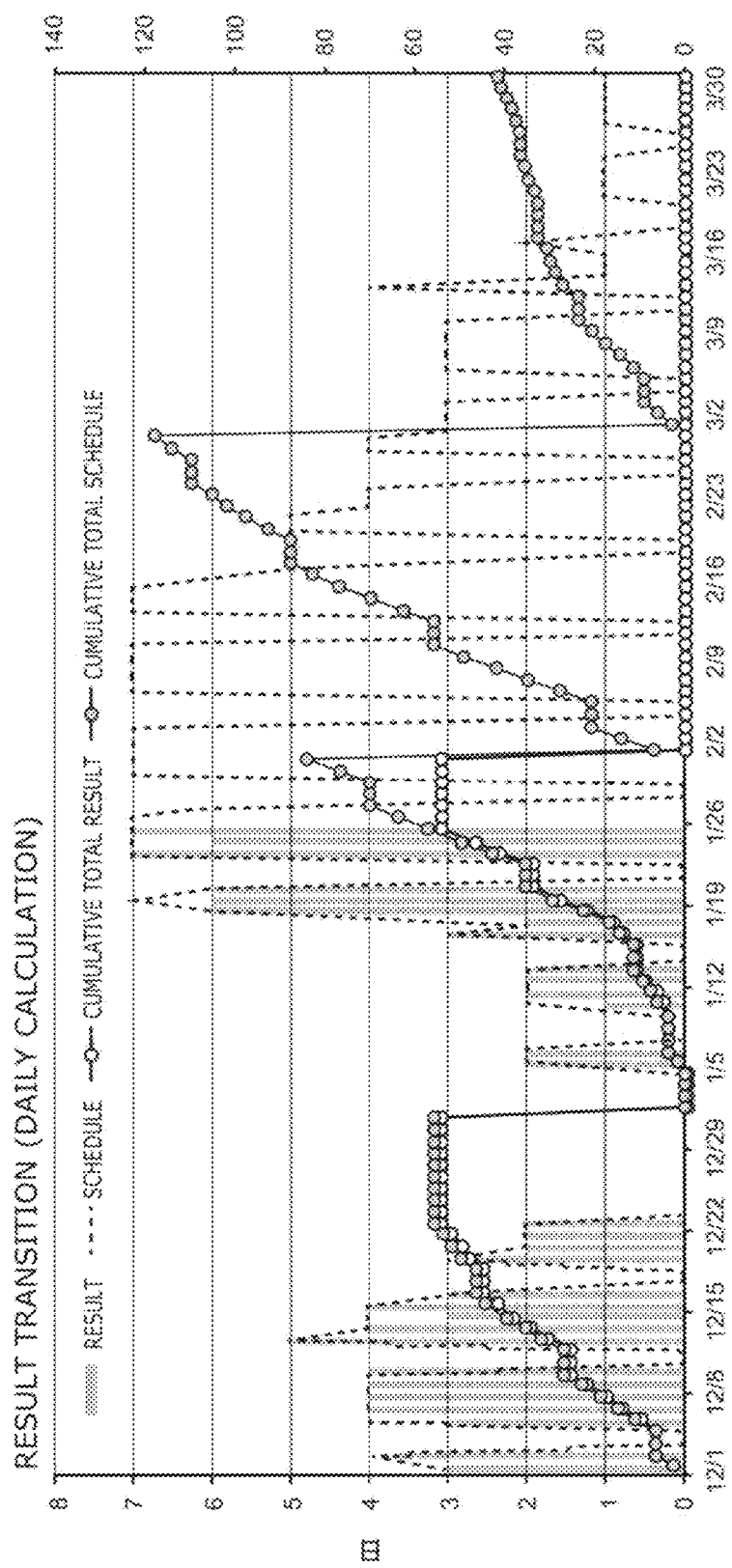

Examples of progress information created from work results included in the work reports by the progress-information creating unit 40 is described with reference to FIGS. 9 to 11. In FIGS. 9 to 11, examples of progress information concerning the installation of the toll gate described with reference to FIGS. 7 and 8 are shown.

FIG. 9 is a diagram showing an example of progress information created by the progress-information creating unit 40 of the information management system 100 according to the first embodiment.

FIGS. 10 and 11 are diagrams showing other examples of progress information created by the progress-information creating unit 40 of the information management system 100 according to the first embodiment.

In a graph of FIG. 9, progress states in a plurality of work places are shown in units of one day. Toll gates where work is performed are shown in rows. Dates are shown in columns. In the respective rows, marks indicating that work is scheduled are shown in upper parts. Under the marks, marks indicating that the work is completed are shown.

By creating the graph, it is easy to confirm progress states in a plurality of sites and overlook and grasp an overall progress state.

In an upper table in FIG. 10, schedules and results for main work items and differences between the schedules and the results are shown in units of one month.

In a lower table in FIG. 10, a schedule and a result and a difference between the schedule and the result in a specific day and ratios of results to schedules are shown.

By representing the progress states using numerical values in a table format in this way, it is possible to more quantitatively confirm and evaluate the progress states.

In a graph in FIG. 11, the horizontal axis represents a date, the vertical axis on the left side represents a man-hour per one day, and the vertical axis on the right side represents a total man-hour. In the graph in FIG. 11, a schedule and a result per one day and cumulative values of for one month of values of the schedule and the result are shown.

By creating the graph, it is possible to perform comparison and examination of schedules and results for one work site in a longer term viewpoint.

As shown in FIGS. 9 to 11, the progress-information creating unit 40 is capable of creating progress information in various formats.

By enabling customers to view the information created by the progress-information creating unit 40, the customers can select and confirm, by themselves, progress information that the customers want to know. Therefore, it is unnecessary to, for example, inquire a company, which performs work, about the progress information.

As described above, with the information management system 100 according to the first embodiment, according to the transfer of the information by the information transfer unit 35, it is possible to share the information while maintaining security.

The progress information shown in FIGS. 9 to 11 may be created by a person in charge who can access at least the progress information database 23. The information management system 100 may include the progress-information creating unit 40 and automatically create the progress information. Consequently, it is possible to improve convenience of use of the system.

A person may perform notification and the like based on fluctuation in the numbers of stocks of members involved in work on a site and information included in a work report. However, since these actions are respectively automatically performed by the inventory managing unit 45 and the notifying unit 50, it is possible to improve convenience of use of the system. Further, it is possible to more efficiently utilize shared information.

Second Embodiment

An input support system 2 according to a second embodiment is described below. The input support system 2 is used in inputting an electronic document by voice. The electronic document includes a work report concerning installation work of an apparatus. The installation work indicates work for installing a relatively heavy apparatus, which is carried in using a truck or the like, in a predetermined place to exhibit functions of the apparatus and fixing the apparatus not to move.

Figure 12:
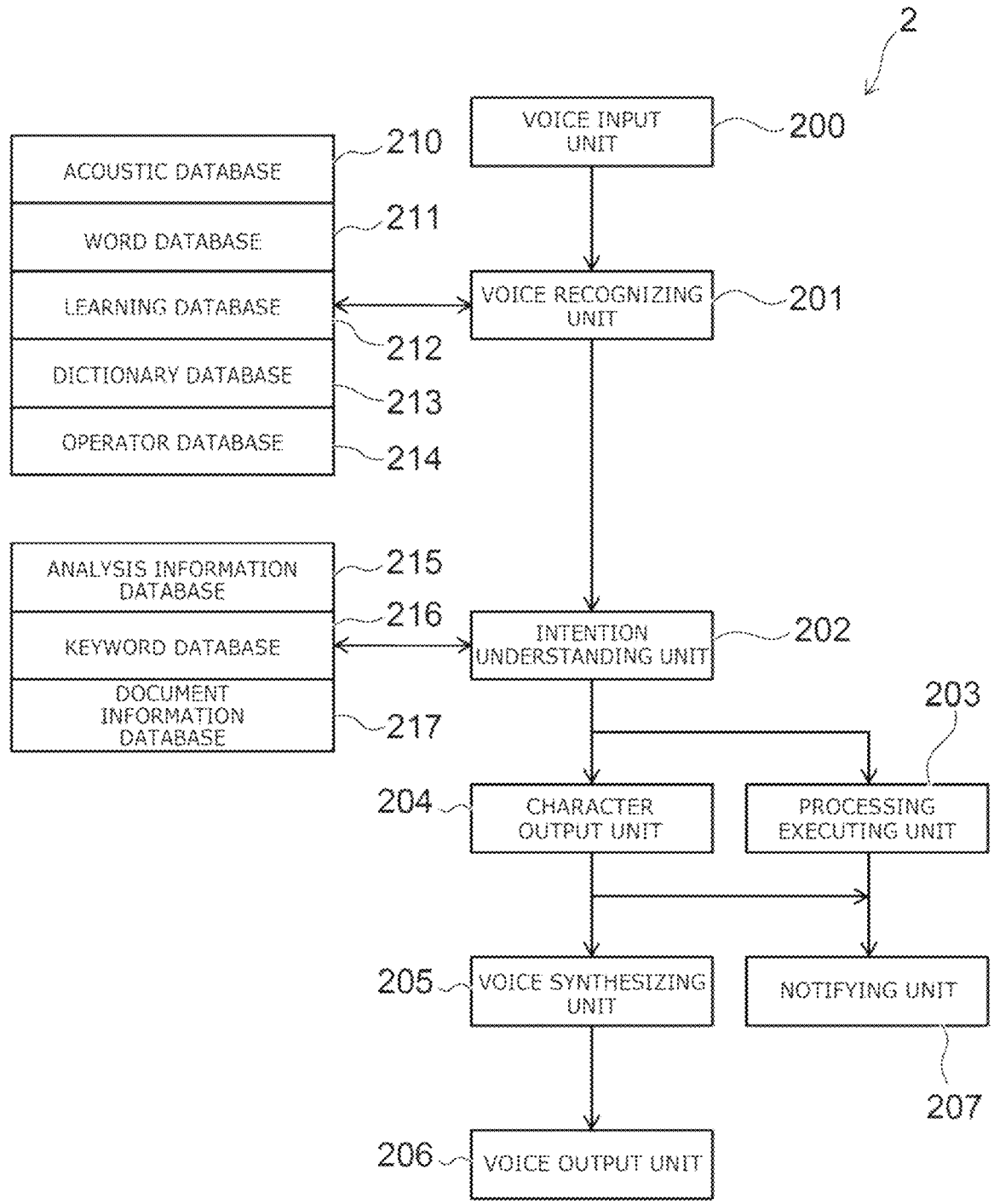
FIG. 12 is a block diagram showing a configuration of an input support system according to a second embodiment.

FIG. 12 is a block diagram showing the configuration of the input support system 2 according to the second embodiment.

Voice is input to a voice input unit 200 by a user (an operator who performs the installation work). The voice input to the voice input unit 200 is converted into information (an electric signal) and input to a voice recognizing unit 201. The voice recognizing unit 201 performs recognition of voice information. The voice recognizing unit 201 may refer an acoustic database 210 and a word database 211 described below while recognizing the voice information.

The acoustic database 210 stores characteristics in phoneme units such as "a", "i", and "u". The acoustic database 210 further stores information concerning correspondence between rows of phonemes and words. The phonemes include waveforms peculiar to the phonemes. The voice recognizing unit 201 compares waveforms included in input voice information and the characteristics of the phonemes stored in the acoustic database 210. The voice recognizing unit 201 recognizes the phonemes included in the voice information on the basis of a result of the comparison.

The word database 211 stores characteristics concerning arrangement of words. As an example, "Installation" and "work" are connected in this order and are not connected in the opposite order. The word database 211 stores statistical information concerning such arrangement of words. The voice recognizing unit 201 estimates a word from a set of phonemes included in the voice information. The voice recognizing unit 201 estimates character information corresponding to the voice information while referring to the characteristics concerning arrangement of words stored in the word database 211.

The voice recognizing unit 201 is described below. The voice recognizing unit 201 may recognize the voice information further referring to a learning database 212, a dictionary database 213, and an operator database 214.

The learning database 212 stores words and sentences included in character information that is output in the input support system 2 in the past. When the character information generated by the voice recognizing unit 201 is approved, deleted, or changed by the operator, the learning database 212 stores the process and the result of the approval, the deletion, or the change. Since the voice recognizing unit 201 performs the voice recognition referring to the learning database 212, it is easier to perform voice recognition conforming to an intention of the operator in the installation site.

The dictionary database 213 stores association of specific character strings. As an example, "installation work site" is registered with respect to "site". In this case, when recognizing that "site" is included in the voice information, the voice recognizing unit 201 estimates this character string as "installation work site". In installation work, in some case, unique words are used or words are abbreviated and used. Therefore, by registering the words in the dictionary database 213 in advance, it is easier to perform the voice recognition conforming to the intention of the operator.

The operator database 214 stores characteristics of voices of operators who perform installation work. For example, the voices of the operators are input through the voice input unit 200 beforehand and feature values of the voices of the operators are extracted. The operator database 214 stores the feature values. Waveforms of voices are different depending on speakers. There are tendencies peculiar to the respective speakers. Therefore, since the voice recognizing unit 201 recognizes the voice information referring to the feature values of voices of the operators, it is possible to more accurately recognize voices of uttering operators.

The voice recognizing unit 201 performs the voice recognition while referring to the databases described above as appropriate. Content of the voice recognition by the voice recognizing unit 201 is input to an intention understanding unit 202.

The intention understanding unit 202 understands (estimates) an intention of the operator included in the recognized content of the voice. The intention understanding unit 202 refers to an analysis information database 215 described below and corrects the recognized content of the voice to conform to the intention of the operator. At the same time, the intention understanding unit 202 determines whether input voice intends an output of characters to an electronic document or intends execution of other operation. During the determination, the intention understanding unit 202 refers to a keyword database 216 and a document information database 217.

The analysis information database 215 stores information necessary for morpheme analysis processing, syntax analysis processing, and semantic analysis processing executed by the intention understanding unit 202. In the morpheme analysis processing, the intention analyzing unit 202 segments a sentence into morphemes, which are minimum units. In the syntax analysis, the intention understanding unit 202 recognizes parts of speech of the segmented morphemes. In the syntax analysis, the intention understanding unit 202 analyzes the structure of a sentence such as a phrase sentence structure on the basis of grammar rules. In the semantic analysis, the intention understanding unit 202 synthesizes, on the basis of semantics (concepts) of words in a sentence, a semantic relation between words, and the like, a semantic sentence structure representing a meaning conveyed by the sentence.

The keyword database 216 stores keywords corresponding to various kinds of processing concerning an electronic document. As an example, processing for "saving an electronic document being created" is associated with a keyword "save". "Save" is included in the recognized content of the voice input to the intention understanding unit 202. In this case, in a process of intention understanding, the intention understanding unit 202 determines whether the operator intends to "save an electronic document being created" or intends to output a character string "save" onto an electronic document.

The document information database 217 stores information such as functions of various electronic documents and item names included in the electronic documents. By referring to the document information database 217, the intention understanding unit 202 is capable of more accurately determine whether the operator intends to operate an electronic document or intends to output characters to an electronic document.

As an example, the intention understanding unit 202 determines that the operator intends to cause the input support system 2 to execute specific processing. In this case, the intention understanding unit 202 outputs an execution request (an event) of the processing to a processing executing unit 203. The processing executing unit 203 executes processing corresponding to a keyword according to the event output from the intention understanding unit 202.

As another example, as a result of the intention understanding in the intention understanding unit 202, the intention understanding unit 202 determines that the operator intends to output character information to the electronic document. In this case, the intention understanding unit 202 corrects the recognized content of the voice to conform to the intention of the operator and outputs the recognized content to a character output unit 204. The character output unit 204 generates character information on the basis of the recognized content output from the intention understanding unit 202 and outputs the character information to a predetermined item of the electronic document. The electronic document, to which the character information is output, is designated in advance by the operator before voice is input. At this time, the character output unit 204 may output the character information, which is output to the electronic document, to a voice synthesizing unit 205.

The voice synthesizing unit 205 generates synthesized voice corresponding to the character information. The voice generated by the voice synthesizing unit 205 is output by a voice output unit 206. Consequently, the operator can confirm, with the voice, the character information output to the electronic document. The voice synthesizing unit 205 may generate synthesized voice for communicating to the operator, for example, when the processing executing unit 203 executes a processing. The voice may be output from the voice output unit 206.

When the intention understanding unit 202 attempts the intention understanding but cannot sufficiently estimate an intention of the operator, the intention understanding unit 202 may output character information indicating insufficient information to the voice synthesizing unit 205. In this case, for example, a question for supplementing the insufficient information is output from the voice output unit 206 to the operator. In response to the question output from the voice output unit 206, the operator responds to the voice input unit 200 by voice. Consequently, the voice recognizing unit 201 and the intention understanding unit 202 perform the recognition of the voice and the intention understanding again.

In the above explanation, the input support system 2 includes the intention understanding unit 202. The input support system 2 does not have to include the intention understanding unit 202. In this case, the character output unit 204 generates character information on the basis of content of voice recognition by the voice recognizing unit 201. The voice recognizing unit 201 refers to the keyword database 216 and the document information database 217 as appropriate. When a keyword is included in the input voice, the voice recognizing unit 201 outputs, to the processing executing unit 203, an event of processing corresponding to the keyword. However, in order to realize the voice recognition conforming to the intention of the operator, the input support system 2 desirably include the intention understanding unit 202.

FIG. 13 is an example of an electronic document for installation work created using the input support system 2 according to the second embodiment.

For example, an item name of the electronic document for the installation work is read aloud from the voice output unit 206 of the input support system 2. The operator utters, to the voice input unit 200, a matter written in a field corresponding to the item name. When the operator utters, character information is output to predetermined field of the electronic document by the voice recognizing unit 201, the intention understanding unit 202, and the character output unit 204. In this way, the read-aloud of an item name by the voice output unit 206 and the utterance to the voice input unit 200 are repeated, whereby the electronic document is created.

A notifying unit 207 may be provided that, when the various kinds of processing concerning the electronic document are executed, notifies a terminal registered in advance to that effect. Since the notifying unit 207 is provided, for example, when an electronic document is created by a voice input and uploaded to a server according to an instruction based on voice, a related person can immediately learn to that effect.

An information processing method executed by the input support system 2 is described with reference to FIG. 14.

Figure 14:
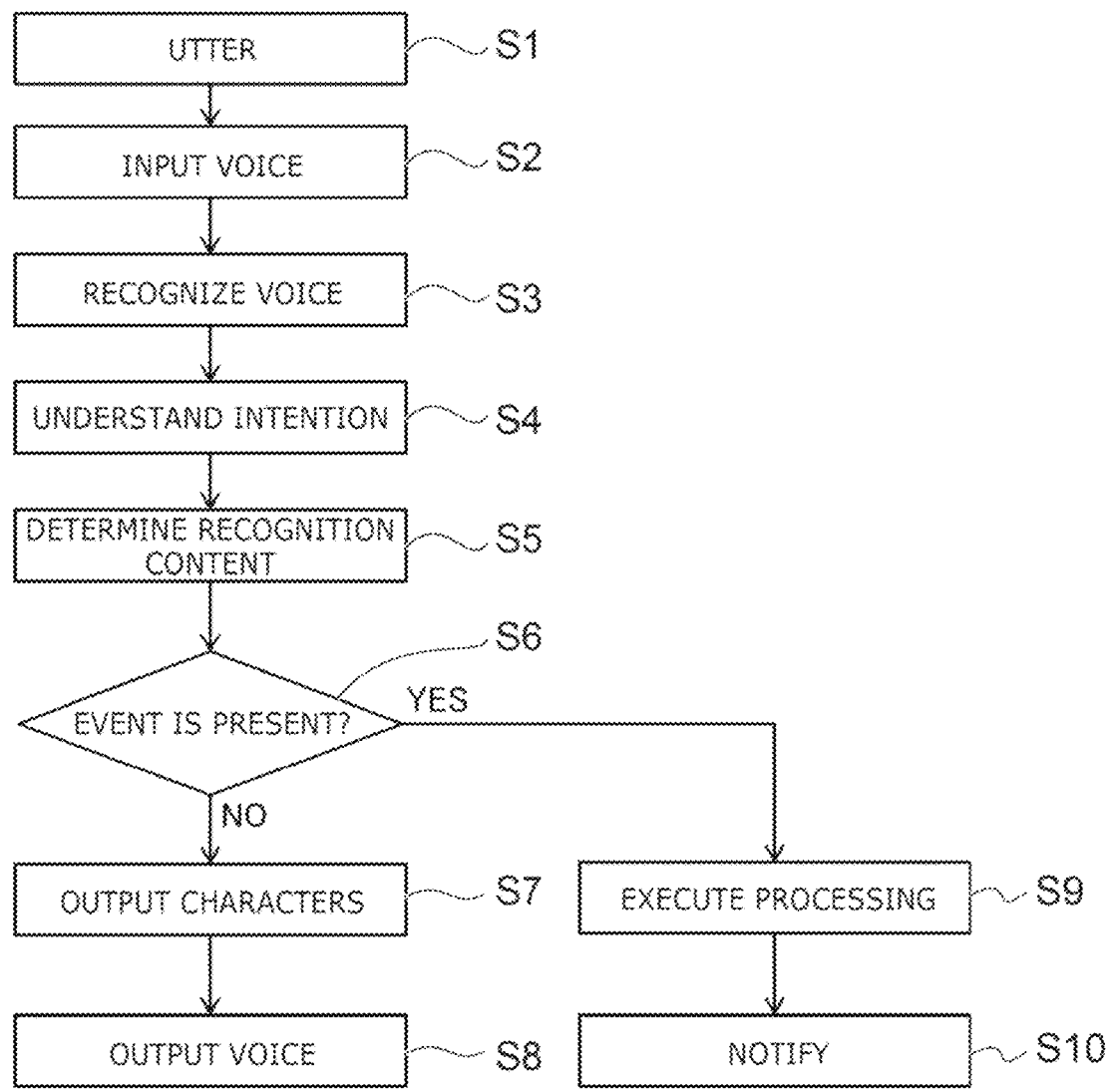
FIG. 14 is a flowchart for describing the operation of the input support system according to the second embodiment.

FIG. 14 is a flowchart for describing the operation of the input support system 2 according to the second embodiment.

The operator utters (step S1). Voice of the utterance is input to the voice input unit 200 (step S2). The voice recognizing unit 201 performs recognition of information concerning the input voice (step S3). The intention understanding unit 202 performs understanding of an intention of the operator (step S4). In steps S3 and S4, the databases shown in FIG. 12 may be referred to.

When the intention understanding is completed, a result of the intention understanding is reflected on the recognized content and the recognized content of the voice is determined (step S5). As a result of the voice recognition, it is determined whether an execution request (an event) for specific processing is present (step S6). When an event is absent, the character output unit 204 generates character information based on the recognized content of the voice and outputs the character information to an electronic document (step S7). The output character information is output as voice according to necessity (step S8).

When an event is present in step S6, the processing executing unit 203 executes specific processing corresponding to the event (step S9). According to necessity, the notifying unit 207 notifies a predetermined transmission destination that the processing is executed (step S10).

A hardware configuration for realizing the input support system 2 according to the second embodiment is described with reference to FIG. 15.

Figure 15:
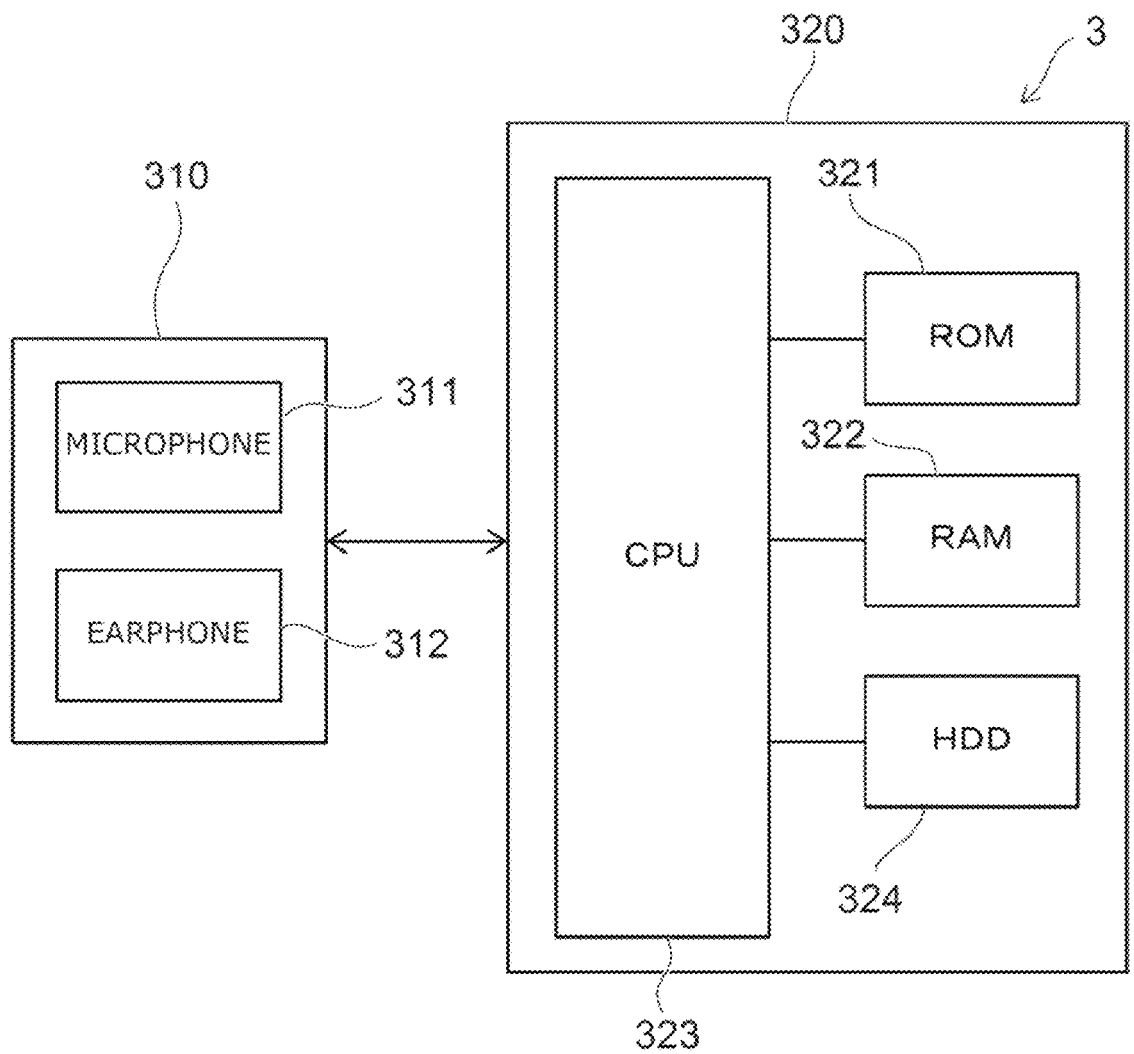
FIG. 15 is a block diagram showing the configuration of an information processing apparatus that realizes the input support system according to the second embodiment.

FIG. 15 is a block diagram showing the configuration of an information processing apparatus 3 that realizes the input support system 2 according to the second embodiment.

The information processing apparatus 3 includes, for example, a terminal 310 and a server 320 connected to the terminal 310 via a communication line.

The terminal 310 includes a microphone 311 functioning as the voice input unit 200 and an earphone 312 functioning as the voice output unit 206. The microphone 311 and the earphone 312 are connected to the terminal 310 via wireless communication such as the Bluetooth (registered trademark). The terminal 310 transmits voice information obtained by the microphone 311 to the server 320. The earphone 312 outputs, as sound, the voice information transmitted from the server 320 to the terminal 310.

The server 320 includes, for example, a ROM (Read Only Memory) 321, a RAM (Random Access Memory) 322, a CPU (Central Processing Unit) 323, and a HDD (Hard Disk Drive) 324. The ROM 321 has stored therein a computer program for controlling the operation of the server 320. The ROM 321 has stored therein computer programs necessary for causing the server 320 to function as the voice recognizing unit 201, the intention understanding unit 202, the processing executing unit 203, the character output unit 204, the voice synthesizing unit 205, and the notifying unit 207 shown in FIG. 12.

The RAM 322 functions as a storage region in which the computer programs stored in the ROM 321 are developed. The CPU 323 reads the control program stored in the ROM 321 and controls the operation of the server 320 according to the control program. The CPU 323 develops various data obtained by the operation of the server 320 in the RAM 322. The HDD 324 has stored therein the databases 210 to 217 shown in FIG. 12. When processing is executed in the CPU 323, the databases stored in the HDD 324 are referred to as appropriate.

In the above explanation, the functions of the input support system 2 are realized by the terminal 310 and the server 320. However, the functions of the input support system 2 may be realized by only the terminal 310.

Effects of the invention according to the second embodiment are described. The input support system 2 according to the second embodiment includes the voice input unit 200, the voice recognizing unit 201, and the character output unit 204. The operator utters, to the voice input unit 200, input content to an electronic document concerning installation work. Consequently, voice of the utterance is recognized by the voice recognizing unit 201. Character information based on the recognized content of the voice is output to the electronic document by the character output unit 204. That is, with the input support system 2, the operator is capable of performing input to the electronic document without operating a keyboard, a touch panel, or the like with a hand.

Therefore, by using the input support system 2 according to the second embodiment, for example, the operator can perform input work to the electronic document by voice while performing manual work. As a result, it is possible to reduce substantial time necessary for creation of the electronic document.

In the voice recognition by the voice recognizing unit 201, it is desirable that the acoustic database 210, the word database 211, and the learning database 212 are referred to. Since the voice recognizing unit 201 performs the voice recognition referring to the databases, it is possible to improve accuracy of recognition.

In a site of the installation work, noise due to electric tools, trucks, cranes, and the like is large and there are a lot of conversations, shouts, and the like of operators. Therefore, it is sometimes hard to recognize voice emitted to the voice input unit 200. Since the voice recognizing unit 201 refers to the characteristics of the voices of the operators stored in the operator database 214, it is possible to more highly accurately recognize the voice of the operator uttered to the voice input unit 200.

Further, since the input support system 2 includes the processing executing unit 203 and the keyword database 216, the operator is capable of performing, by voice, operation other than the output of the character information to the electronic document. It is possible to perform, by voice, various kinds of processing such as saving of the electronic document to which the character information is output, upload of the electronic document, creation of which is completed, and transmission of the electronic document to related people. Therefore, it is possible to reduce time required for processing concerning the electronic document.

The input support system 2 further includes the notifying unit 207. When the processing concerning the electronic document is executed, the notifying unit 207 notifies a predetermined transmission destination to that effect. Therefore, it is possible to quickly communicate information to related people. For example, in the installation work, various documents such as a report are created. The report may inform that a deficiency of an apparatus to be installed occurs and a report to which progress information of the operators is input. Since the processing concerning the electronic documents is notified to the related people, it is possible to more efficiently perform the installation work and work incidental to the installation work.

The microphone functioning as the voice input unit 200 and the earphone functioning as the voice output unit 206 are connectable to a terminal via wireless communication. Therefore, the operator can perform input to the electronic document by uttering to the voice input unit 200 in a place apart from the terminal. The operator does not need to move to the terminal to create the electronic document.

The information management system 100 according to the first embodiment can be used in combination with the input support system 2 according to the second embodiment.

Figure 16:
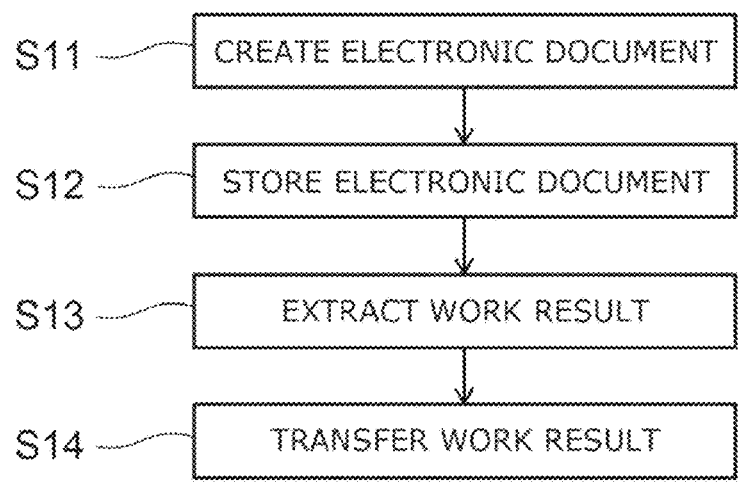
FIG. 16 is a flowchart for describing the operation of the information management system according to the first embodiment in which the input support system according to the second embodiment is used.

FIG. 16 is a flowchart for describing the operation of the information management system 100 according to the first embodiment in which the input support system 2 according to the second embodiment is used.

In the installation work, the information management system 100 creates an electronic document using the input support system 2 (step S11). The electronic document includes a work report. The electronic document is stored in the electronic document database 22 (step S12). When the electronic document is stored in the electronic document database 22, the information transfer unit 35 extracts a work result from the electronic document (step S13). The information transfer unit 35 transfers the extracted work result to the progress information database 23 (step S14).

By combining the first embodiment and the second embodiment, it is possible to efficiently create an electronic document. A part of information included in the created electronic document is automatically extracted and transferred to the other databases. Therefore, it is possible to perform efficient creation of the electronic document, efficient sharing of information, and maintenance of security.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. An information management system comprising:
    an input support system for inputting, in installation work of an apparatus, an electronic document including a work report concerning the installation work by voice
    a production management database storing a work schedule;
    an electronic document database storing the work report;
    a progress information database storing progress information; and
    a computer processor programmed to:
        set an access authority for viewing or updating for each of the databases including:
            setting a first access authority to a first terminal so that the first terminal can access the production management database, the electronic document database, and the progress information database;
            setting a second access authority to a second terminal so that the second terminal can access the progress information database and the electronic document database but cannot access the production management database; and
            setting a third access authority to a third terminal so that the third terminal can access the progress information database but cannot access the production management database and the electronic document database,
        transfer, among the databases, information stored in each of the databases including:
            transferring, in accordance with a storage of the work report from the second terminal to the electronic document database, the work schedule from the production management database to the progress information database; and
            transferring a work result included in the work report from the electronic document database to the progress information database,
        create the progress information using the transferred work schedule and the transferred work result, and
        store the progress information in the progress information database, wherein the input support system includes:
            a voice input unit to which voice is input; and
            a computer processor programmed to:
                recognize the voice input to the voice input unit, and output character information based on recognized content of the voice to the electronic document,
    the electronic document, to which the character information is output, is stored in the electronic document database,
    the computer processor of the input support system is programmed to understand an intention included in the recognized content of the voice,
    the input support system further includes an analysis information database in which information necessary for morpheme analysis processing, syntax analysis processing, and semantic analysis processing executed in the understanding the intention is stored,
    the computer processor of the input support system is programmed to:
        correct the recognized content of the voice to conform to the intention; and
        output the character information based on the corrected the recognized content of the voice to the electronic document,
    the computer processor of the input support system is programmed to generate synthesized voice corresponding to the character information, and
    the input support system further includes a voice output unit configured to output the synthesized voice.

2. The information management system according to claim 1, wherein the computer processor is programmed to:
    create the progress information using the transferred work result and the transferred work schedule, and
    store the progress information in the progress information database.

3. The information management system according to claim 1, wherein the computer processor is programmed to issue a notification to a predetermined terminal when the work report includes first information concerning abnormality of a member.

4. The information management system according to claim 1, wherein the computer processor is programmed to issue a notification to a predetermined terminal when the work report includes second information concerning a deficiency in design of a member.

5. The information management system according to claim 1, further comprising a manufacturing history database in which an arrival result of a member is stored, wherein
    the computer processor is programmed to update inventory information the member used for work,
    the work report includes a use result of the member in the work, and
    the computer processor is programmed to update the inventory information of the member in the manufacturing history database using the arrival result and the use result of the member.

6. The information management system according to claim 1, wherein
    the computer processor is programmed to transfer third information from the production management database to the electronic document database so as to input the third information to the work report, and
    the third information includes a member used for work and a process included in the work.

7. The information management system according to claim 1, further comprising a customer information database in which information concerning a site of a customer where work is performed is stored, wherein
    the computer processor is programmed to, when the work report is input, transfer a name of the site and a place of the site from the customer information database to the electronic document database so as to input the name of the site and the place of the site to the work report.

8. The information management system according to claim 1, wherein the progress information stored in the progress information database is configured to be viewable from the third terminal of a customer.

9. The information management system according to claim 1, wherein the input support system further includes:
an acoustic database in which characteristics of phonemes are stored;
a word database in which a characteristic of arrangement of words is stored;
a dictionary database in which association of specific character strings is stored;
a learning database in which words extracted from the character information in the past are stored; and
an operator database in which characteristics of voices of respective operators are stored, and
the computer processor of the input support system is programmed to recognize the voice referring to the word database, the acoustic database, the learning database, and the operator database.

10. The information management system according to claim 1, wherein the input support system further includes a keyword database configured to store a keyword corresponding to processing concerning the electronic document; and
the computer processor of the input support system is programmed to execute the processing corresponding to the keyword included in the voice.

11. The information management system according to claim 10, wherein the computer processor of the input support system is programmed to, when the processing is executed, notify a predetermined transmission destination.

\* \* \* \* \*